(12) United States Patent
Diminick et al.

(10) Patent No.: US 8,182,927 B2
(45) Date of Patent: May 22, 2012

(54) RECYCLED CELLULOSIC INDUSTRIAL AND COMMERCIAL ABSORBENT MATTING

(75) Inventors: Anthony Scott Diminick, Hollidaysburg, PA (US); R. Douglas Evans, Jr., Everett, PA (US); Dane R. Jackson, Port Matilda, PA (US)

(73) Assignee: New Pig Corporation, Tipton, PA (US)

( * ) Notice: Subject to any disclaimer, the term of this patent is extended or adjusted under 35 U.S.C. 154(b) by 0 days.

(21) Appl. No.: 12/704,127

(22) Filed: Feb. 11, 2010

(65) Prior Publication Data
US 2011/0045312 A1     Feb. 24, 2011

Related U.S. Application Data

(60) Provisional application No. 61/151,560, filed on Feb. 11, 2009.

(51) Int. Cl.
*D04H 1/06*     (2006.01)

(52) U.S. Cl. ......... 428/532; 428/534; 428/536; 442/361

(58) Field of Classification Search .................. 428/534, 428/532, 536; 442/361
See application file for complete search history.

(56) References Cited

U.S. PATENT DOCUMENTS

| | | | | |
|---|---|---|---|---|
| 5,883,025 | A | * | 3/1999 | Karstens et al. ............... 442/344 |
| 5,981,410 | A | * | 11/1999 | Hansen et al. ................. 442/361 |
| 2007/0044891 | A1 | | 3/2007 | Sellars |
| 2007/0056674 | A1 | | 3/2007 | Sellars |
| 2008/0233381 | A1 | | 9/2008 | Sellars et al. |

FOREIGN PATENT DOCUMENTS

| | | | |
|---|---|---|---|
| WO | 9101396 | | 2/1991 |
| WO | WO91/01396 | * | 2/1991 |

* cited by examiner

*Primary Examiner* — Leszek Kiliman
(74) *Attorney, Agent, or Firm* — Benjamin T. Queen, II; Alan G. Towner, Esq.; Pietragallo Gordon Alfano Bosick & Raspanti, LLP

(57) ABSTRACT

An absorbent structure is provided which comprises a first outer layer, a second outer layer, a core layer positioned between the first outer layer and the second outer layer, wherein the core layer comprises a recycled cellulose material, and a core bonding agent.

21 Claims, 2 Drawing Sheets

RECYCLED CELLULOSIC INDUSTRIAL AND COMMERCIAL ABSORBENT MATTING

CROSS-REFERENCE TO RELATED APPLICATION

This application claims the benefit of U.S. Provisional Patent Application Ser. No. 61/151,560 filed Feb. 11, 2009, which is incorporated herein by reference.

BACKGROUND OF THE INVENTION

The present invention relates to an absorbent matting made from recycled cellulosic material.

Industrial absorbents such as mats for spill kits are typically made from virgin materials like polypropylene and polyester fiber. These materials are effective, but costly and subject to virgin raw material price variations.

For production of industrial and commercial absorbent matting, recycled cellulosic material provides a cost effective alternative to using virgin materials such as polypropylene or wood pulp. One sustainable and effective source of recycled cellulosic material is Cellulose Lost in Industrial Production (CLIP). CLIP provides an excellent substitute in many applications in which the aforementioned absorbents are used. CLIP is a combination of mostly cellulose wood pulp with a polymer, binder or a bonding agent. These non-cellulose additions have made finding a beneficial reuse of CLIP problematic. CLIP is most often treated as a waste product and landfilled by the manufacturer.

SUMMARY OF THE INVENTION

An aspect of the present invention is to provide an absorbent structure, comprising: a first outer layer, a second outer layer, a core layer positioned between the first outer layer and the second outer layer, wherein the core layer comprises a recycled cellulose material, and a core bonding agent.

This and other aspects of the present invention will be more fully understood following a review of this specification and drawings.

DETAILED DESCRIPTION

Figure 1:
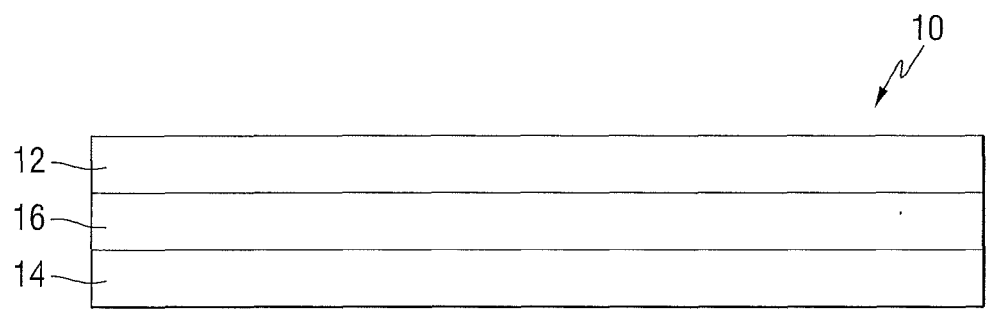
FIG. 1 is a cross-sectional diagram of a recycled cellulosic absorbent structure, in accordance with an aspect of the invention.

In accordance with an aspect of the invention, Cellulose Lost in Industrial Production, (CLIP), can provide a cost effective source of raw material for the absorbent industry. Some products in which CLIP would be a suitable absorbent include, for example, absorbent mats, socks, pillows, media for pans and containment decks, industrial and commercial wipers and packing material. Alternatively to and in addition to CLIP, Post Consumer Cellulosic Waste Streams (PCCWS) could be used in accordance with the scope of the invention. Typically PCCWS would have, for example, at least 70% cellulose content.

The fibrous content of CLIP makes it an excellent candidate as a raw material for making industrial and commercial absorbents. In fact, it has shown to have better absorbent characteristics than some other virgin materials. However, it can be difficult to produce an absorbent product like a mat using natural fibers, such as CLIP, due to the relatively short length of the fibers and the presence of polymer, binders or other bonding agents. The short fibers can cause dusting and poor fiber bonding. A synthetic fiber may be provided to serve as a bonding site for natural fibers.

In accordance with an aspect of the invention, the process of converting cellulose wood pulp into an absorbent article involves a fiberization process that reduces virgin cellulose material to a fluff. The processing of the CLIP and/or PCCWS also involves a fiberization process to form a mat through a drylaid process, specifically an airlaid process. The term mat as used herein generally denotes a single sheet or a continuous roll of an absorbent fibrous web. Airlaid processes can vary in design. In one aspect of the invention, the forming surfaces utilized may be constructed with a wire screen or fluted grid, and a pneumatic flow mechanism, such as provided by a vacuum suction system, may be employed to define a differential pressure zone on the forming surface and impose a pressure differential thereon. The pressure difference provides airflow through the openings or perforations in the screen or grid of the forming surface. The airflow holds the mat on the grid while chemical or mechanical adhesion takes place.

In accordance with one aspect of the invention, CLIP and/or PCCWS can be mixed with other materials prior to being introduced to the forming surface to promote a stabilized web. The other materials may include, for example, adhesives, binder powders and binder fibers. The binder fibers may include, for example, one or more of the following types of fibers: homofilaments, heat-fusable fibers, bi-component fibers, sheath and core fibers, polyethylene fibers, polypropylene fibers, and the like. In accordance with the invention, a stabilized fibrous mat may be made by mixing the binder fibers with CLIP and/or PCCWS fibers, and then depositing the mixed fibers onto a forming surface. Heat may be applied to the material on the forming surface during or after forming to activate the binder. Cooling may be applied after forming to allow the binder to set.

Some commercial and industrial applications for which this invention is intended require fire retardancy due to high temperature, sparking, and open flame applications. The CLIP and PCCWS waste in their initial form are typically combustible.

Some commercial and industrial applications for which this invention is intended require that the product only absorb hydrocarbons and not aqueous fluids. The cellulosic content of CLIP and PCCWS may cause the product to absorb aqueous fluids.

While most of commercial and industrial absorbent applications involve hydrocarbons, there is also a need to absorb aqueous fluids such as aqueous cutting fluids, aqueous coolants, and water. The polymer and other binders present in the CLIP and PCCWS in its initial form may not be optimized for aqueous absorbent applications.

The addition of fire retardant compounds (for example: ammonium sulfate, boric acid, or diammonium phosphate), and surfactants, (for example: Anionic, Cationic and Non-ionic types), and hydrophobic compounds (for example: silicone) are required separately and possibly in combination to make the CLIP and PCCWS suitable for industrial and commercial absorbent applications. These additions, if applied directly to the finished mat may result in uneven and poorly distributed application of the compounds that may result in loss of absorbency and loft. In industrial and commercial absorbent applications, product color has historically been used as an efficient indicator to allow end-users to match the appropriate product for the appropriate chemical spill.

An aqueous batch treatment process of applying these fire retardant, surfactant and hydrophobic compounds, plus a colorant simultaneously to the CLIP and PCCWS is used to overcome the inherent shortcomings of recycling CLIP and PCCWS for industrial and commercial absorbent applications. After application and drying, the CLIP and PCWWS can now be fiberized without the loss of the beneficial chemical properties that have been added to the material. These compounds are now evenly and more permanently distributed. The process of fiberizing the CLIP and PCCWS after the addition of these compounds increases the loft of the web and the absorption capacity of the subsequent manufactured web.

Referring to FIG. 1, there is illustrated a recycled cellulosic absorbent structure constructed in accordance with an aspect of the invention. For illustration and description purposes, the absorbent structure 10 will be referred to herein as absorbent mat (or matting) 10. However, it will be appreciated that the absorbent structure of the invention may be other types of absorbent structures as well.

Still referring to FIG. 1, the absorbent mat 10 includes a three layer configuration, constructed in accordance with an aspect of the invention. However, it will be appreciated that the absorbent mat 10 of the invention may have additional layers as well. The absorbent mat 10 includes a first outer layer 12 and a second outer layer 14 (which together may also be referred to herein as "outer layers"). The outer layers 12 and 14 may include the CLIP and/or PCCWS which contains cellulose fibers and a polymer or other binders remaining from the previous manufacturing process. In accordance with an aspect of the invention, the outer layers 12 and 14 include and are held together with a newly added bonding agent. The bonding agent may be, for example, a heat fusible agent including one or more of homofibers, multi-component fibers, powders made of amorphous polyester, polyethylene, and/or polypropylene. However, in other aspects of the invention the outer layers 12 and 14 may be formed of other materials such as, for example, non woven materials, spunbond, meltblown, and/or needpunch.

Figure 2:
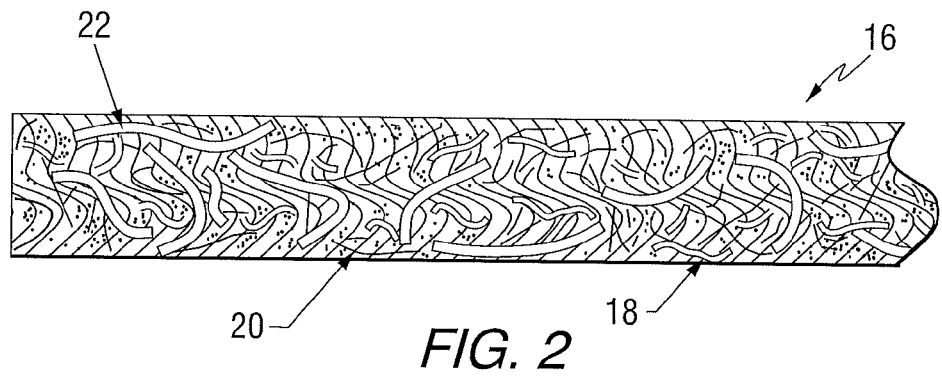
FIG. 2 illustrates a magnified cross-section of a core layer of the recycled cellulosic absorbent structure of FIG. 1, in accordance with an aspect of the invention.

Referring to FIGS. 1 and 2, the absorbent mat 10 further includes a middle or core layer 16 between the outer layers 12, 14. Specifically, FIG. 2 illustrates a magnified cross-section of the core layer 16 of the recycled cellulosic absorbent matting 10, in accordance with an aspect of the invention. The core layer 16 includes the CLIP and/or PCCWS which contains cellulose fibers 18 and a polymer or other binders 20 remaining from the previous manufacturing process. In accordance with an aspect of the invention, the core layer 16 includes and is held together with a newly added bonding agent material 22. The bonding agent may be for example, a heat fusible agent including one or more of homofibers, multi-component fibers, powders made of amorphous polyester, polyethylene, and/or polypropylene. In accordance with one aspect of the invention, FIG. 2 may also be representative of the composition of the outer layer 12 and/or outer layer 14. However it will be appreciated that outer layers 12 and/or 14 may have different compositions as described herein.

Figure 3:
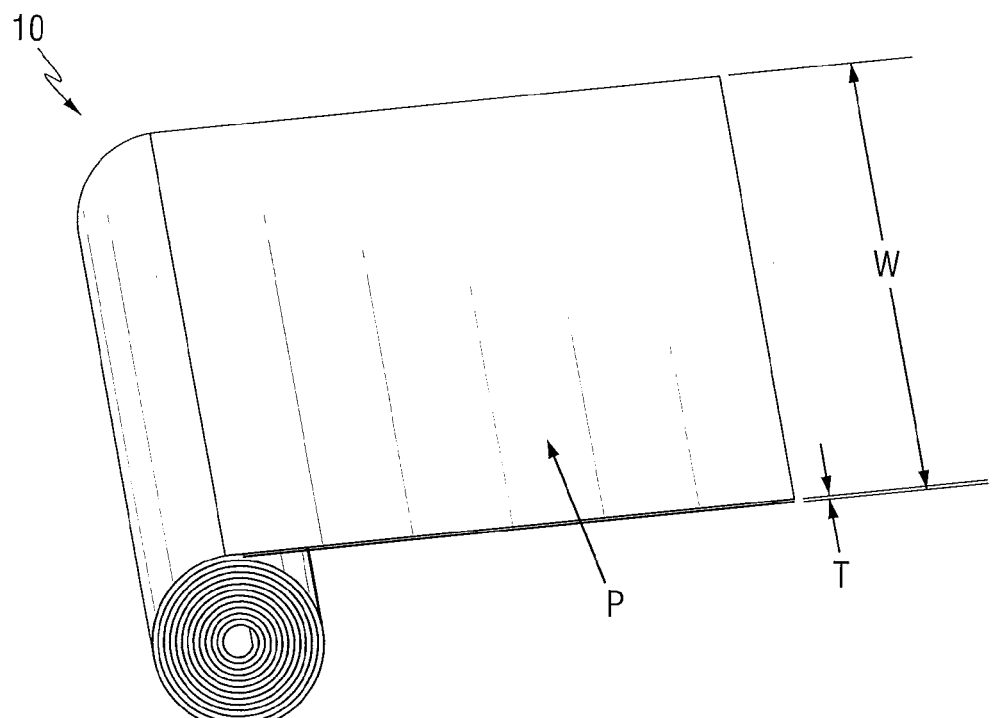
FIG. 3 is the absorbent structure of FIG. 1 shown in a "roll" configuration, in accordance with an aspect of the invention.

Referring now to FIG. 3, the absorbent mat 10 is shown in a "roll" configuration, in accordance with an aspect of the invention. The mat 10 may have a width, W, in the range of, for example, about several inches to about several feet wide. The mat 10 may have a thickness, T, in the range of, for example, about 0.02 inch to about 1 inch, for example from about 0.06 inch to about 0.5 inch, and particularly about 0.125 inch to about 0.400 inch. It will be appreciated that thickness T is sometimes generally referred to as loft or bulk in reference to a matting material. In one aspect of the invention, as shown in FIG. 3, the matting 10 may be in the form of the illustrated roll and be made into individual mats or left in a single continuous sheet. Additionally, a continuous sheet may be perforated, as shown at P, so the user may easily tear an individual mat from a roll.

In making the invention, the airlaid process typically forms a web as a series of layers built up to obtain the require basis weight of the mat. When the airlaid mat has a minimum of three layers, the outer layers 12, 14 can be differentiated from the middle layer(s) or core 16. For industrial absorbent mats that require fire retardancy, the outer layers are engineered to contain a higher level than the core of fire retardant chemical. Adding a higher level of fire retardant chemical to core does not significantly improve the mat's fire retardancy; it only increases costs and decreases the mat's oil absorbency since the fire retardant chemicals are taking the place of the absorbent CLIP and/or PCCWS. In many mat applications, having fire retardant only in the outer layers is more than sufficient to prevent flame propagation. Industrial absorbent mats require the outer layers to have a high level of surface durability. The core does not require this high level of durability. It does require enough z-directional strength to prevent delamination of the adjacent outer layers. The amount of bonding agent in the core can be reduced and replaced with more of the absorbent CLIP and/or PCCWS.

The mat 10 may also contain a colorant to distinguish its Manufacturer brand or its intended use. Color is also preferred in mats to help mask dirt and footprints during use. To avoid having costly colorants throughout the mat, they can be limited to the outer layers 12, 14 where they are most effective. However, it will be appreciated that the core layer 16 may also include a colorant.

If aqueous absorbency is also desired, a hydrophilic surfactant may be contained in the outer layers 12, 14. Any absorbed aqueous fluid will carry the hydrophilic surfactant with it as it absorbs through the outer layers and into the core. This will speed absorption in this less hydrophilic core material. The hydrophilic surfactant may also be contained in the CLIP and/or PCCWS and bonding agent mix that forms the outer layers or it may be applied to the outer layers' outer surface after the mat is formed. In accordance with another aspect of this invention the core layer 16 could have the hydrophilic surfactant added to it also.

Conversely where absolutely no aqueous absorbency can be tolerated, a hydrophobic agent can be added to the outer layer and/or core in place of the surfactant to repel aqueous fluids.

The airlaid process may require that the edges of the mat be trimmed during formation. This trim can be refiberized to make it acceptable for reprocessing back into a mat. Since this refiberized edge trim is a combination of the all layers and their different make-ups, it is desirable to recycle it back only into the middle layer(s) as not to dilute the effects of the higher loadings of fire retardant, colorant, bonding agent, and/or surfactant in the skin layer. The recycled refiberized edge trim typically only makes up a fraction of the core basis weight; this is dependent on the basis weight ratio of the outer layers to the core and the amount of edge trim being recycled.

Some mat applications require different performance on different surfaces of the mat, so the outer layers composition need not be identical on each surface of the mat in these instances.

Additionally, the fiber make-up of the outer layers and the core may be different. For example the pulp to polymer ratio of the core CLIP and or PCCWS may be optimized to give the core different properties than the outer layers, such as increasing the pulp content of the core for increased absorbent capacity.

Figure 4:
FIG. 4 is a cross-sectional diagram of an additional recycled cellulosic absorbent structure, in accordance with an aspect of the invention.

Referring to FIG. 4, there is illustrated an additional recycled cellulosic absorbent structure constructed in accordance with an aspect of the invention. For illustration and description purposes, the absorbent structure 110 will be referred to herein as an absorbent mat (or matting) 110. However, it will be appreciated that the absorbent structure of the invention may be other types of absorbent structures as well.

Still referring to FIG. 4, the absorbent mat 110 includes a multilayer configuration, constructed in accordance with an aspect of the invention. The mat 110 may include outer layers 130 formed of CLIP and/or PCCWS (which may or may not be treated with surfactant, fire retardants, hydrophobic agents, and colorant as described herein). To further enhance system strength, fire retardancy and aqueous absorption a subsequent layer 132 may be inserted and include CLIP and/or PCCWS treated with surfactant and fire retardants. The recycled trimmed edges of the mat described in this instant embodiment may be integrated into any of the non-outer layers 130. Based on any limited availability of CLIP and/or PCCWS, an additional layer 136 may be inserted of virgin cellulose wood pulp.

Still referring to FIG. 4, CLIP and/or PCCWS and/or wood pulp may be combined with 10% to 40% bicomponent fiber having an outer sheath of polyethylene with a core fiber of polypropylene (or PET) prior to forming. The mixture is delivered to the forming surface. The formed mixture is then heated to a temperature at or above the melting point of sheath polyethylene. The melted polyethylene locks the CLIP and/or PCCWS and/or wood pulp into a criss-cross matrix of fibers that are fused together. Additionally, any other polyethylene material contained in the CLIP and/or PCCWS will melt and bond to the cellulosic material in the CLIP and/or PCCWS. Once cooled, the mixture forms a stable web of fibrous absorbent material.

In accordance with an aspect of the invention, the binder fiber selected to bond the CLIP and/or PCCWS material activates below the softening or melting point of any polymer portion of the CLIP and/or PCCWS material to give optimum properties to the resultant mat. If the bonding fiber chosen activates at or above the CLIP and/or PCCWS polymer softening or melting point then the web properties are degraded due to at least one of the following: 1) The polymer portion acts as a secondary adhesive resulting in a higher web modulus, e.g., the web stiffness increases and drape-ability decreases. In this case the bonding is principally between synthetic polymers in the CLIP and/or PCCWS and not the cellulose portion. Thus, this secondary bonding does not help bind the cellulose portion within the web. 2) The CLIP/PCCWS polymer portion will shrink as it approaches its melting point causing the web to contract in thickness and decreasing its void volume. Void volume is directly related to the amount of liquid a web can absorb, thus the absorbency will be reduced. Additionally, the web will lose some of its resiliency resulting in the perception that the web is not as absorbent.

In one example of the invention, a binder fiber was chosen that activates at 127° C. The polymer portion of the CLIP activates at approximately 135° C.; this gives a bonding window of approximately 7° C. for optimizing the mat properties. The ovens that activate the CLIP/Binder fiber matrix are controlled so that the mat interior reaches about 127° C., but never above the activation temperature of the CLIP polymer. In this way the binder fiber is activated but not the polymer portion of the CLIP so mat modulus, absorbency, and resiliency are optimized.

In accordance with an aspect of the invention, a process for making the invention may include the following. First, batch treating recycled cellulosic material in an aqueous bath of coloring dye and/or fire retardant chemical and/or hydrophilic surfactant and/or hydrophobic agent, and then drying the treated material. Next, metering and fiberizing the dried untreated and/or treated recycled cellulosic material and then metering in a heat fusible bonding agent prior to transferring to the forming heads of an airlaid web forming equipment. Next, air forming at least three layers of fiberized recycled cellulosic material with said bonding agent into an unbonded mat. Then, heating the unbonded mat to a temperature that activates the bonding agent but below the softening or melting temperature of other mat components. Next, cooling the resulting bonded mat to a temperature below the activation temperature of the bonding agent.

Whereas particular aspects of this invention have been described above for purposes of illustration, it will be evident to those skilled in the art that numerous variations of the details of the present invention may be made without departing from the invention as defined in the appended claims.

What is claimed is:

1. An absorbent structure comprising:
   a first outer layer;
   a second outer layer; and
   a core layer positioned between the first outer layer and the second outer layer, wherein the core layer comprises:
   a recycled material comprising cellulose and a polymer; and
   a core bonding agent, wherein the polymer of the recycled material has a melting temperature above a melting temperature of the core bonding agent.

2. The absorbent structure of claim 1, wherein the first outer layer comprises a first recycled cellulose material and a first bonding agent.

3. The absorbent structure of claim 2, wherein the second outer layer comprises a second recycled cellulose material and a second bonding agent.

4. The absorbent structure of claim 1, wherein the core bonding agent is heat fusible.

5. The absorbent structure of claim 1, wherein the core bonding agent includes one or more of homofibers, multi-component fibers, powders made of amorphous polyester, polyethylene, and/or polypropylene.

6. The absorbent structure of claim 1, wherein the recycled cellulose material is cellulose lost in industrial production.

7. The absorbent structure of claim 1, wherein the recycled cellulose material is a post consumer cellulosic waste stream.

8. The absorbent structure of claim 3, wherein the first and second recycled cellulose material is cellulose lost in industrial production.

9. The absorbent structure of claim 3, wherein the first and second recycled cellulose material is a post consumer cellulosic waste stream.

10. The absorbent structure of claim 1, wherein the first and second outer layers include a fire retardant material.

11. The absorbent structure of claim 1, wherein the core layer includes a fire retardant material.

12. The absorbent structure of claim 1, wherein the first and second outer layers include a colorant material.

13. The absorbent structure of claim 1, wherein the core layer includes a colorant material.

14. The absorbent structure of claim 3, wherein the first and second bonding agents are heat fusible.

15. The absorbent structure of claim 3, wherein the first and second bonding agents each includes one or more of homofibers, multi-component fibers, powders made of amorphous polyester, polyethylene, and/or polypropylene.

16. The absorbent structure of claim 14, wherein the first and second outer layers include more of the heat fusible bonding agent than the core layer.

17. The absorbent structure of claim 1, wherein the first and second outer layers include a hydrophobic agent.

18. The absorbent structure of claim 1, wherein the core layer includes a hydrophobic agent.

19. The absorbent structure of claim 1, wherein the first and second outer layers include a hydrophilic surfactant.

20. The absorbent structure of claim 1, wherein the core layer includes a hydrophilic surfactant.

21. The absorbent structure of claim 1, wherein the core layer includes material refiberized from the entire absorbent structure.

* * * * *